(12) United States Patent
Shinagawa et al.

(10) Patent No.: US 7,965,014 B2
(45) Date of Patent: Jun. 21, 2011

(54) STATOR FOR ELECTRICAL ROTATING MACHINE

(75) Inventors: Masataka Shinagawa, Wako (JP);
Kimiaki Nakamura, Wako (JP)

(73) Assignee: Honda Motor Co., Ltd., Minato-Ku, Tokyo (JP)

( * ) Notice: Subject to any disclaimer, the term of this patent is extended or adjusted under 35 U.S.C. 154(b) by 0 days.

(21) Appl. No.: 12/557,947

(22) Filed: Sep. 11, 2009

(65) Prior Publication Data

US 2010/0066199 A1 Mar. 18, 2010

(30) Foreign Application Priority Data

Sep. 12, 2008 (JP) ................................ 2008-234932

(51) Int. Cl.
*H02K 21/00* (2006.01)
(52) U.S. Cl. ...................... 310/216.113; 310/216.024
(58) Field of Classification Search ........... 310/216.004, 310/216.009, 216.024, 216.027, 216.033, 310/216.074, 216.096, 216.102, 216.106, 310/216.113, 216.109, 216.111
See application file for complete search history.

(56) References Cited

U.S. PATENT DOCUMENTS

| 2,500,191 | A  | * | 3/1950 | Lee ............................... 388/803 |
| 6,211,595 | B1 | * | 4/2001 | Nose ...................... 310/216.111 |
| 6,448,682 | B2 | * | 9/2002 | Sakagami et al. ..... 310/216.057 |

FOREIGN PATENT DOCUMENTS

| JP | 09-009532 | 1/1997 |
| JP | 2006-271161 | 10/2006 |

* cited by examiner

*Primary Examiner* — Dang D Le
(74) *Attorney, Agent, or Firm* — Squire, Sanders & Dempsey (US) LLP

(57) ABSTRACT

A stator includes: a plurality of divided cores disposed to have a ring shape; a stator winding toroidally wound on the stator; and a holding member that holds the divided cores in the ring shape. Each of the divided cores includes: a bobbin part for the stator winding; a yoke extending from the bobbin part in the circumferential direction; a connection part extending from the yoke outwardly in a radial direction with a connection face that is connected to the holding member; and a tooth extending from the yoke inwardly. The connection part has a magnetic gap to increase a magnetic resistance in a path of magnetic flux, generated by the stator winding, leaked to the holding member through the connection face. The magnetic gap is a notch or a weld.

8 Claims, 7 Drawing Sheets

STATOR FOR ELECTRICAL ROTATING MACHINE

CROSS REFERENCE TO RELATED APPLICATIONS

This application claims the foreign priority benefit under Title 35, United States Code, §119(a)-(d) of Japanese Patent Application No. 2008-234932, filed on Sep. 12, 2008 in the Japan Patent Office, the disclosure of which is herein incorporated by reference in its entirety.

BACKGROUND OF THE INVENTION

1. Field of the Invention

The present invention relates to a stator for an electrical rotating machine and particularly to a stator for an electrical rotating machine including a holding member for holding a plurality of divided cores disposed in a circumferential direction in a ring.

2. Description of the Related Art

A stator for an electrical rotating machine, in which a winding is toroidally wound for thinning and down-sizing of the electrical rotating motor, is known.

JP 2006-271161A discloses a stator having divided cores and three parts protruded outwardly are provided with equiangular intervals to reduce magnetic flux leaked to a fixing member for fixing the stator (see FIG. 2). Three protruded parts are held with the holding member, and to prevent short-circuiting, directions and magnitudes of U-, V-, and W-phase currents are electrically controlled so that leakage of the magnetic flux from the three protruded parts is suppressed.

JP 09-9532A discloses a technology in which notches are provided at an outer circumferential part of an annularly shaped stator to reduce leaked magnetic flux.

SUMMARY OF THE INVENTION

A first aspect of the present invention provides a stator having a ring shape for an electrical rotating machine, comprising: a plurality of divided cores disposed in a circumferential direction of the stator; a stator winding toroidally wound on the stator; a holding member that is connected to an outer circumferential faces of the divided cores and holds the divided cores in the ring shape, wherein each of the divided cores comprises: a bobbin part on which the stator winding is wound; a yoke extending from the bobbin part in the circumferential direction; a connection part extending from the yoke outwardly in a radial direction of the stator with a connection face that is connected to the holding member; and a tooth extending from the yoke inwardly in the radial direction, wherein the connection part comprises a magnetic gap to increase a magnetic resistance in a path of magnetic flux, generated by the stator winding, leaked to the holding member through the connection face, wherein the magnetic gap comprises a notch or a weld.

In this configuration, the holding member for holding the divided cores is provided, which may secure stiffness in the stator and suppresses vibrations and an impact because outer circumferential faces of the divided cores are connected to or fitted into the holding member.

Further, the magnetic gap is provided to increase the magnetic resistance in a path of magnetic flux, generated by the stator winding, leaked to the holding member through the connection face (passing through the holding member via the connection face). This allows the path of the magnetic flux to bypass the magnetic gap with a larger loop magnetic flux path. This may decrease the magnetic flux in magnitude that is leaked to the holding member to suppress an eddy current loss in the holding member with improvement of output characteristics of the electrical rotating machine.

In other words, the magnetic flux leaked to the holding member through the connection face is loss (eddy current loss in the holding member) because the magnetic flux is not interlinked with a rotor. However, according to the configuration, the magnetic resistance of the path of the magnetic flux is increased, which may result in increase in magnitude of a main flux generated by the stator winding, interlined with the rotor. This may decrease the magnetic flux in magnitude leaked to the holding member through the connection face. Accordingly, an effective magnetic flux interlinked with the rotor of an electrical rotating machine is increased in magnitude with improvement of output characteristics of the electrical rotating machine.

If the magnetic gap may be provided by forming the notch, a magnetic gap (air gap) with a higher magnetic resistance is provided.

Instead the notch, a weld (weld zone) may be formed as the magnetic gap which has a higher magnetic resistance than a case where the weld were not provided. Further, if the weld is provided, for example, a plurality of electrical steel plates are laminated and integrated by welding such as spot welding, which may improves productivity of the divided cores.

A second aspect of the present invention provides the stator based on the first aspect, wherein the connection part includes a side face that is an end of the connection part in the circumferential direction and defines a slot for the stator winding together with the bobbin part and the magnetic gap is between the side face and the connection face of the connection part.

According to this configuration, the magnetic gap is disposed between the side face of the connection part in the circumferential direction near the stator winding. This bypasses the leaked magnetic flux generated around the stator winding with a high magnetic flux density generated around the stator core winding.

A third aspect of the present invention provides a stator core based on the second aspect, wherein the notch is formed in the connection part so that an end of the connection part includes a taper part when viewed in an axial direction near an end of the connection face.

According to the configuration, a shape of the notches can be adequately modified in accordance with the output characteristic of the electrical rotating machine.

A fourth aspect of the present invention provides a stator core based on the second aspect, wherein the tooth comprises a magnetic gap comprising another weld to increase a magnetic resistance in a path of magnetic flux, generated by the stator winding, to the tooth of an adjacent divided core at a location inside the stator winding in the radial direction on a side face of the tooth that is an end of the tooth in the circumferential direction that defines a slot for the stator winding together with the bobbin part.

According to this configuration, in addition of the weld (first weld) disposed at the connection part, a second weld at the tooth part may be further provided. This further decreases the leaked magnetic flux at an inner circumferential part of the stator in magnitude in addition to the magnetic flux leaked to the holding member, so that an effective magnetic flux interlinked with the rotor of the electrical rotating machine can be increased in magnitude with improvement in output characteristic of the electrical rotating machine.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

Prior to describing embodiments of the present invention, the above-mentioned related art will be further explained.

In the stator disclosed in JP 2006-271161A, because parts of a stator are protruded at a plurality of locations and the protruded parts are held with the fixing member, if the protruded parts are held strongly, a holding force becomes uneven in a circumferential direction. Thus, there is a limit in increasing the holding force for the stator. Thus an increase in an output characteristic of the electrical rotating machine may result in lack in stiffness against vibrations and an impact.

In the technology disclosed in JP 09-9532A, because notches are formed inside an outer circumference of a stator, a stiffness of the stator may decrease. If increase in an output characteristic of an electric rotating machine is required, stiffness against vibrations and an impact may become insufficient.

The present invention provides a stator for an electrical rotating machine in which divided cores are strongly held to decrease leakage of magnetic flux to suppress eddy currents in a holding member. This improves an output characteristic.

The stator according to the present invention improves an output characteristic by suppressing the leaked magnetic flux to reduce an eddy current loss in the holding member with securely holding the divided cores with a plurality of the divided cores being strongly held.

Will be described a stator for an electrical rotating machine according to first and second embodiments of the present invention with reference to drawings.

First Embodiment

Figure 1:
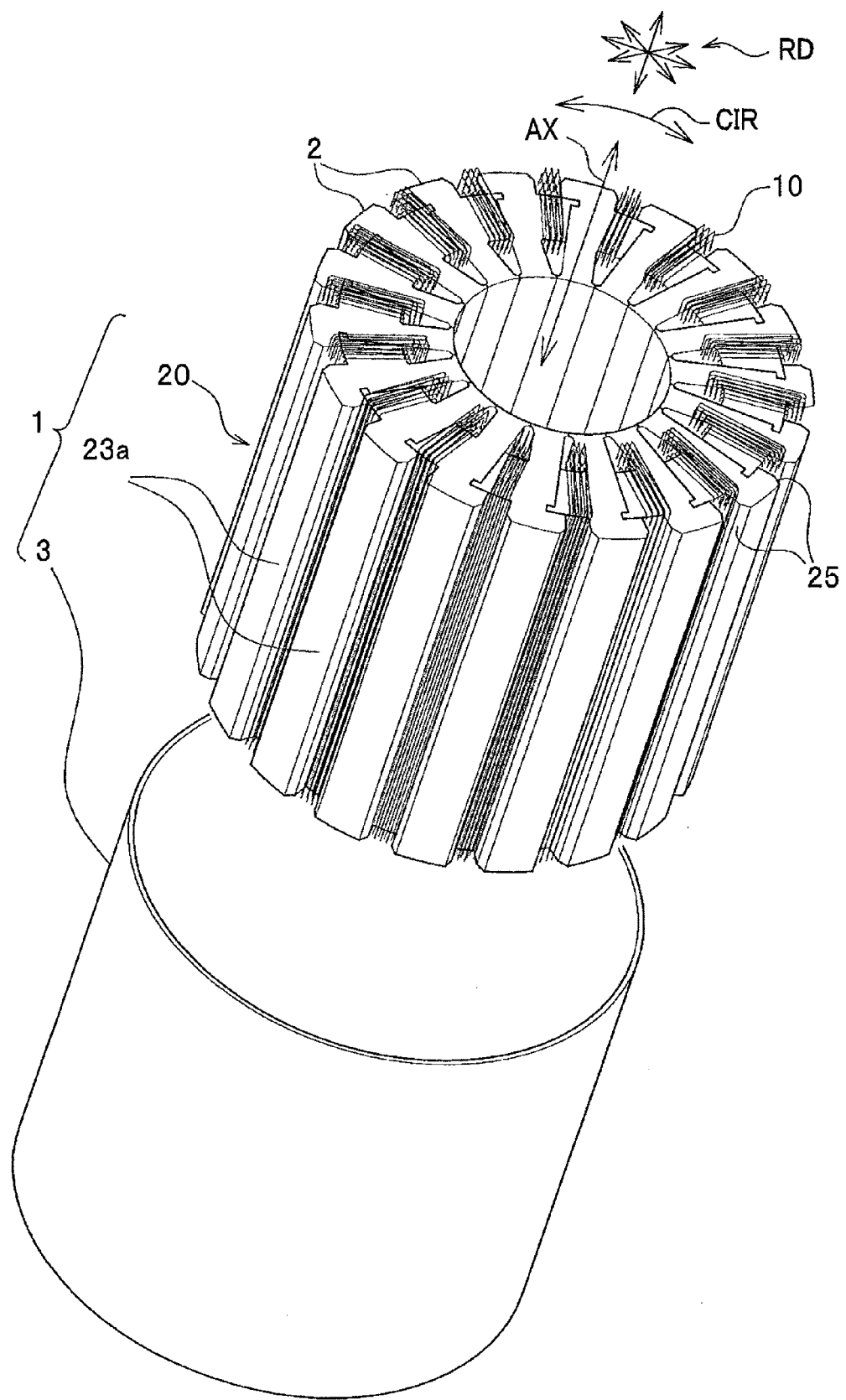
FIG. 1 is an exploded perspective view of a stator for an electrical rotating machine according to first and second embodiments of the present invention.
Figure 2:
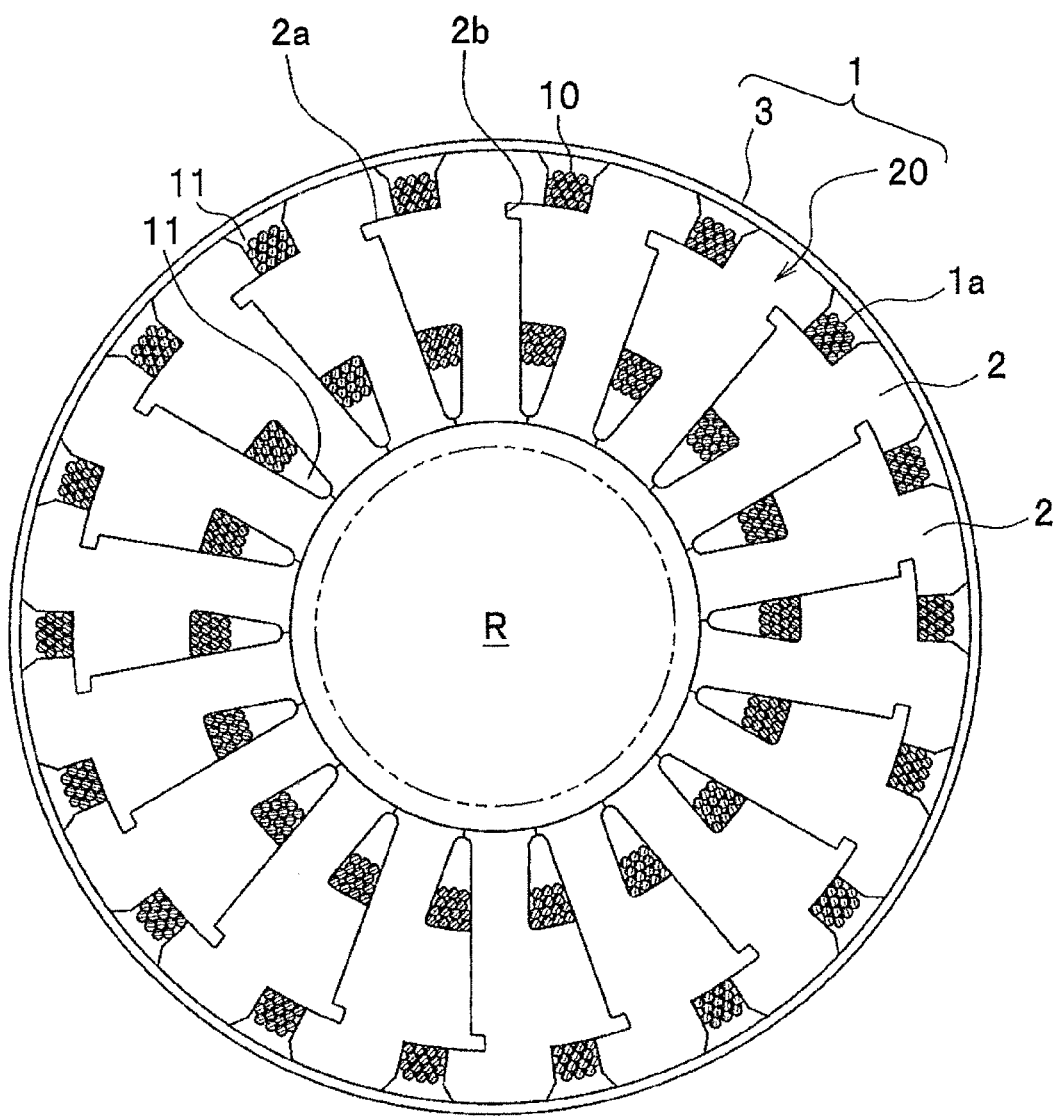
FIG. 2 is a sectional view of an electrical rotating machine including the stator for the electrical rotating machine according to the first and second embodiments of the present invention.

FIG. 1 is an exploded perspective view of the stator for the electrical rotating machine according to first and second embodiments of the present invention, and FIG. 2 is a sectional view of an electrical rotating machine including the stator for the electrical rotating machine according to the first and second embodiments of the present invention.

Figure 3A:
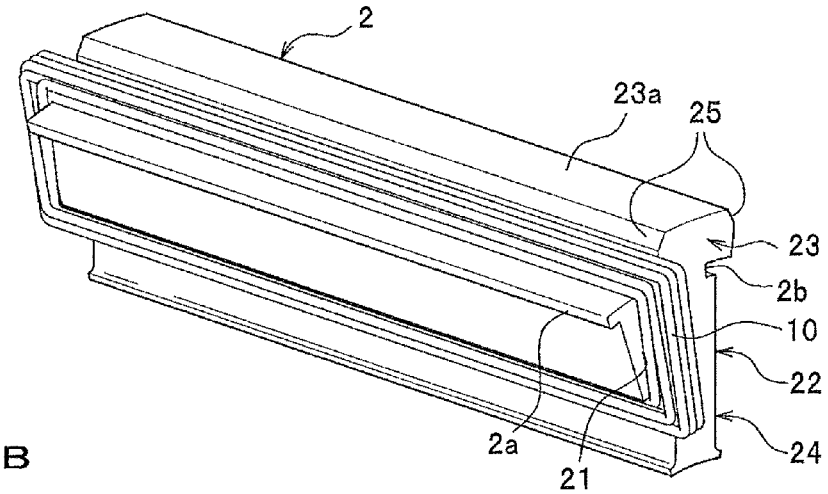
FIG. 3A is a perspective view of a divided core shown in a status where a stator winding wire is wound on the divided core.
Figure 3B:
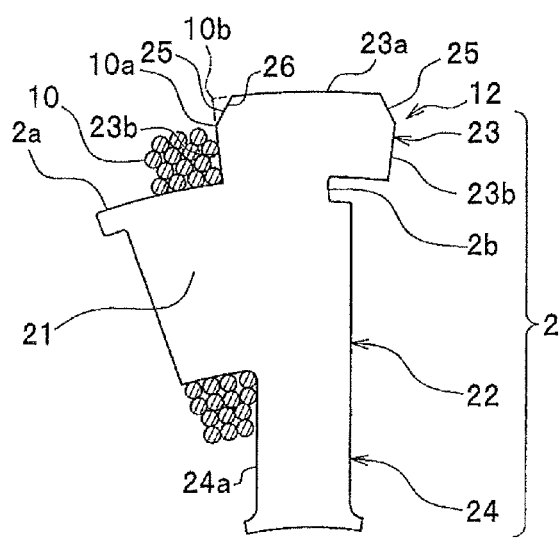
FIG. 3B is a sectional view of the divided core shown in FIG. 3A.
Figure 3C:
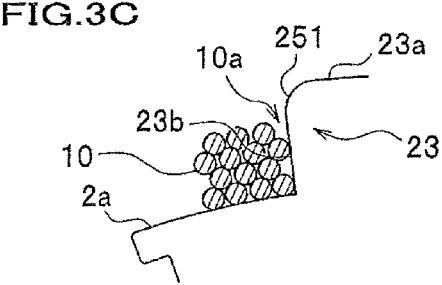
FIGS. 3C and 3D are partial sectional views of the divided cores having different shapes in the notches.
Figure 3D:
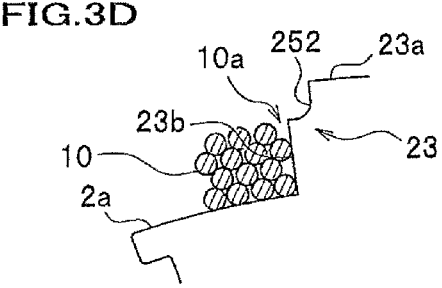

FIG. 3A is a perspective view of a divided core shown in a status where a stator winding is wound on a divided core 2. FIG. 3B is a sectional view of the divided core 2 shown in FIG. 3A. FIGS. 3C and 3D are partial sectional views of the divided cores having different shapes of the notches.

Figure 4A:
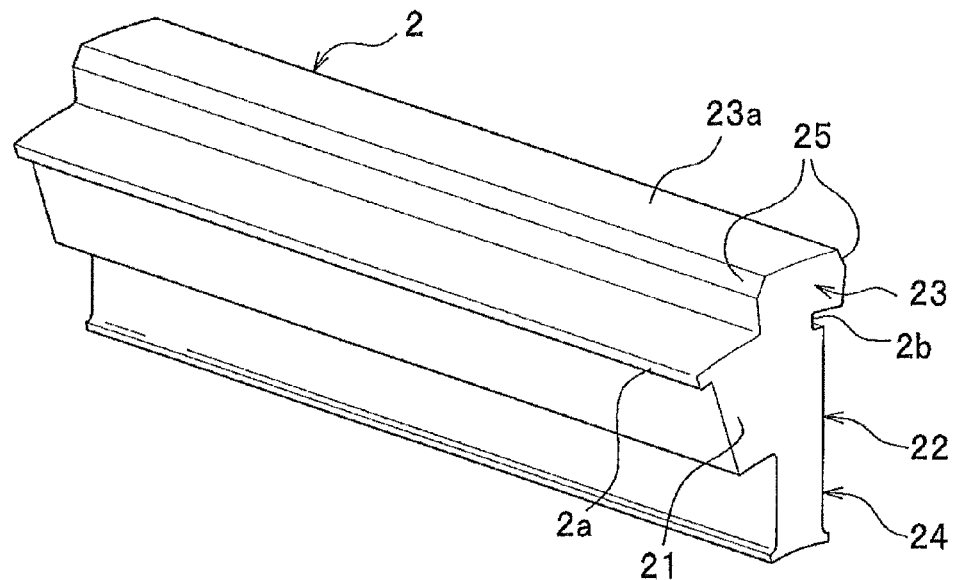
FIG. 4A is a perspective view of the divided core according to the first and second embodiments for showing a configuration of the divided core.
Figure 4B:
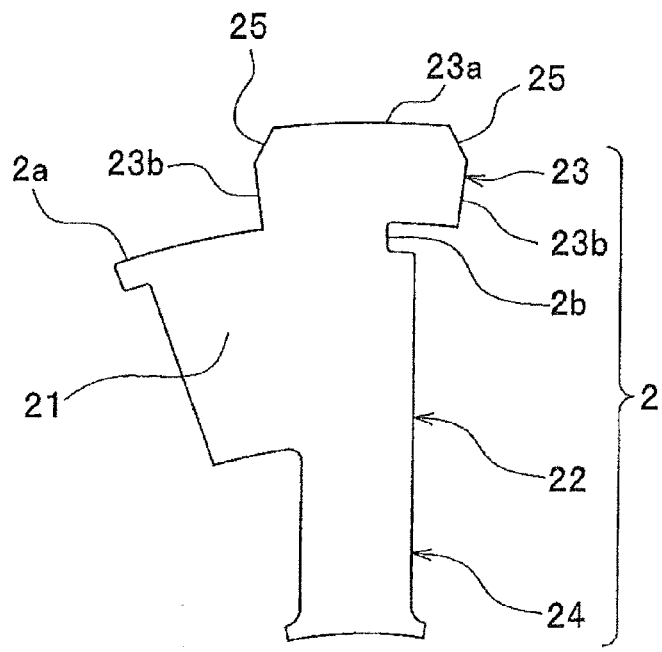
FIG. 4B is a plan view of the divided core shown in FIG. 4A.

FIG. 4A is a perspective view of the divided core according to the first and second embodiments for showing a configuration of the divided core. FIG. 4B is a plan view of the divided core 2 shown in FIG. 4A.

The electrical rotating machine according to the embodiment of the present invention can be used as, for example, a motor (not shown) in which a stator R is disposed inside a stator 1 as shown in FIG. 2, so that the motor can be miniaturized and thinned.

The stator 1 for the electrical rotating machine according to the first and second embodiments includes a core unit 20 including a plurality of divided cores 2, 2—arranged in a circumferential direction of the stator 1 to form a ring (toroidal) on which a stator winding 10 is toroidally wound (like a toroidal coil) and a holding member 3 for holding the divided cores 2.

The holding member 3 is configured for thermal insert into the core unit to strongly hold the core unit 20 (a size of the holding member 3 are slightly smaller than that of the corresponding part of the core unit 20 in a normal status and becomes slightly larger in a thermal insert process at a thermal insert temperature).

This configuration allows a plurality of divided cores 2 to be thermally fitted into the holding member 3, which provides even tightening force along an inner circumferential of the holding member 3 on connection faces 23a of the divided cores 2. Thus a stiffness of the stator 1 can be secured. The holding member 3 preferably comprises a metal (non-magnetic materials such as aluminum, copper having a magnetic permeability the same or near that of the air without hysteresis loss are preferable).

In the first embodiment, the holding member 3 is thermally fitted in consideration of easiness in manufacturing, However, the present invention is not limited to this, but may be modified. For example, the divided cores 2 are strongly held by shrink fitting method.

The divided core 2 comprises a magnetic member (for example, a soft magnetic material such as a silicon steel plate, a magnetic powder core, permalloy, a dust core, having a higher magnetic permeability than the air and no coercive force). As shown in FIGS. 4A and 4B, the divided core 2 includes a bobbin part 21 on which the stator winding 10 is wound (see FIG. 3), a yoke 22 extending from the bobbin part 21 in a circumferential direction CIR (see FIG. 1) of the stator 1, a connection part 23 extending from the yoke 22 outwardly in a radial direction RD of the stator 1 having a connection face 23a to be connected to the holding member 3 (see FIG.

1), and a tooth 24 extending from the yoke 22 inwardly in the radial direction RD of the stator 1.

As shown in FIG. 4B, the connection part 23 has a notch 25 with a tapered sectional shape at an edge between the side face 23 (end face in the circumferential direction of the connection part 23) and the connection face 23a to provide a magnetic gap. In other words, the connection part 23 has a taper part 12 at an end thereof (see FIG. 3B). The side faces 23b define a slot 11 (see FIG. 2) for a space of turns of the stator winding 10 together with the bobbin part 21 (outside face thereof in radial direction RD in FIG. 3B). Similarly, side faces 24a of the tooth 24 define a slot 11 (see FIG. 2) for a space of turns of the stator winding 10 together with the bobbin part 21 (inward face thereof in radial direction RD in FIG. 3B). As shown in FIG. 4A the notch 25 is formed across an entire length of the connection part 23 in an axial direction AX of the stator 1 (see FIG. 1).

More specifically, as shown in FIG. 3B and FIG. 3A, the notch 25 is formed such that an edge (imaginary edge) 10b between the side face 23b and the connection face 23a is beveled such that a triangle defined by the edge 10a and the slope 26 (when viewed in the axial direction AX) is cut (actually may be not cut), so that an end of the connection part 23 is tapered with the slope 26 (linear slope viewed in the axial direction AX, i.e., a flat slope face viewed in the circumferential direction CIR)) with a triangle sectional area.

An edge 10a on the side face 23b located outwardly in the radial direction RD near the stator winding 10 with a height equal to or higher than that of a bundle of the stator windings 10 in the slot 11 from an upper face of the bobbin part 21. The slope 26 extends from the edge 10a toward the connection face 23a to form the taper part 12 as shown in FIG. 3B.

Similarly, at the other side face 23b of the connection part 23, the notch 25 is formed.

Preferably, the notch 25 is formed with, for example, R (roundness)>0.5 and C (Chamfer)>0.5, but any values are allowed as long as a desired magnetic resistance is provided.

According to the configuration, the notch 25 is provided to form a magnetic gap so as to increase a magnetic resistance of a path of a part of the magnetic flux generated by the stator winding 10 leaked through the connection face 23a to the holding member 3 (passing through the holding member 3 via the connection face 23a).

In the embodiment, the notch 25 with the linear slope 26 (a flat slope face) is provided for forming a magnetic gap. However, the present invention is not limited to this shape. For example, a notch 251 (see FIG. 3C) having an arc on a sectional view is formed to be in contact with the edge 10a or a notch 252 with a U-shaped sectional area (see FIG. 3D). In other words, it is preferable to modify the shape of the notch in accordance with a shape of a peripheral portion of the divided core 2 and a method of winding the stator winding 10.

Further, the divided core 2 includes a tenon 2a and a mortise 2b to be fitted into the tenon 2a to engage the divided core 2 with adjacent divided cores 2. Fitting the tenon 2a to the mortise 2b joins the divided cores 2 in the circumferential direction CIR to hold the divided cores 2. However, the tenon 2a and mortise 2b are not necessarily required, but the divided cores 2 are surely held by fitting the divided cores 2 into the holding member 3 in a state where inner circumferential parts of the divided cores 2 are abutted.

Figure 5:
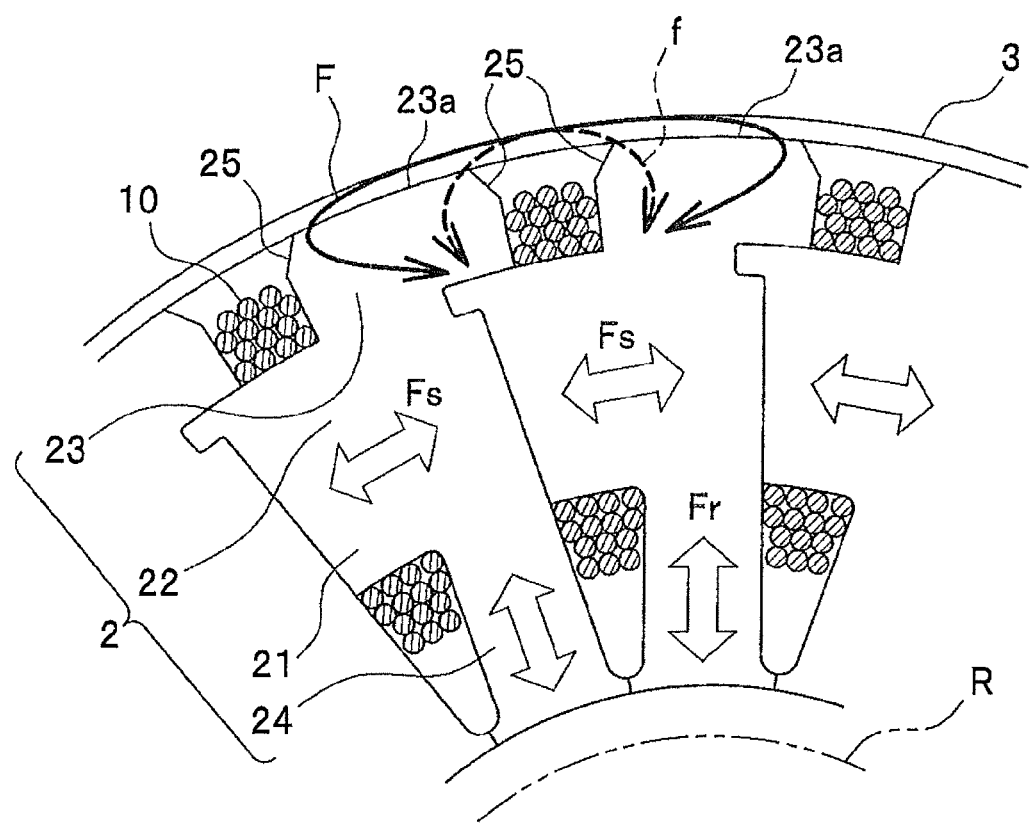
FIG. 5 is a partial sectional view of the stator according to the first embodiment of the present invention for illustrating operation of the notch.

Next, referring mainly to FIG. 5, will be descried an operation of the stator for an electrical rotating machine according to the first embodiment. FIG. 5 is a partial sectional view of the stator 1 according to the first embodiment of the present invention for describing an operation of the notch 25 in the stator 1.

When a current flows through the stator winding 10 in the stator 1 according to the embodiment of the present invention, as shown in FIG. 5, the stator winding 10 generates there-around main magnetic flux Fs on a magnetic path extending in a circumferential direction at the yoke 22 of the stator 1 and a main magnetic flux Fr on a magnetic path extending from the main magnetic flux Fs via the tooth 24 and in the radial direction RD.

With generation of the main magnetic flux Fs and the main magnetic flux Fr, leakage magnetic fluxes F and f leaking through the connection face 23a are generated.

More specifically, the leakage magnetic flux f is generated to have a loop path around the stator winding 10 and is mainly generated when the notch is not provided. On the other hand, the leakage magnetic flux F is formed with a larger loop (longer distance) than the leakage magnetic flux f and is generated mainly when the notch 25 is provided. Accordingly, the leakage magnetic flux F forms a magnetic path with a magnetic flux density that is lower than that of the leakage magnetic flux f.

In other words, lack of the notch 25 increases a magnetic flux leaked through the connection face 23 to the holding member 3 (leakage magnetic flux f). On the other hand, if the notch 25 is formed, the leakage magnetic flux can be reduced (leakage magnetic flux F).

As mentioned above, forming of the notch 25 to increase the magnetic resistance on the path of the leakage magnetic flux f which is leaked through the connection face 23 can reduce the leakage magnetic flux because the leakage magnetic flux F bypasses the notch 25 and its vicinity. This forms a magnetic path F with a larger length loop than the magnetic path of leakage magnetic flux f where the notch 25 is not provided.

Because the leakage magnetic flux does not interlink with the rotor R (see FIG. 5) of the motor (electrical rotating machine, not shown), the leakage magnetic flux is loss. Thus, suppressing the leakage magnetic flux decreases an eddy current loss in the holding member 3. Further, suppression of the leakage magnetic flux increases the magnetic fluxes Fs and Fr interlinking the rotor R by a quantity of suppression.

In the stator 1 for the electrical rotating machine according to the first embodiment of the present invention, the leakage magnetic flux f leaked to the holding member 3 through the connection face 23a can be suppressed. In other words, the magnetic flux (leakage flux) that does not contribute to generation of torque in the electrical rotating machine can be suppressed with the divided cores firmly held with the holding member 3. This increases a quantity of effective magnetic flux interlinking with the rotor R, and thus improves an efficiency and output characteristics of the electrical rotating machine.

Second Embodiment

Figure 6A:
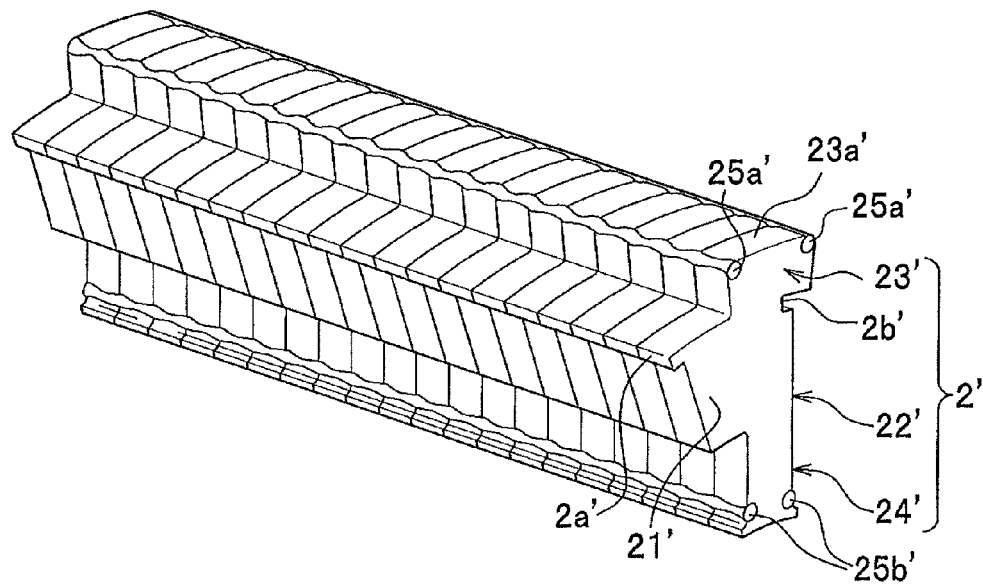
FIG. 6A is a perspective view of a divided core according to a second embodiment of the present invention.
Figure 6B:
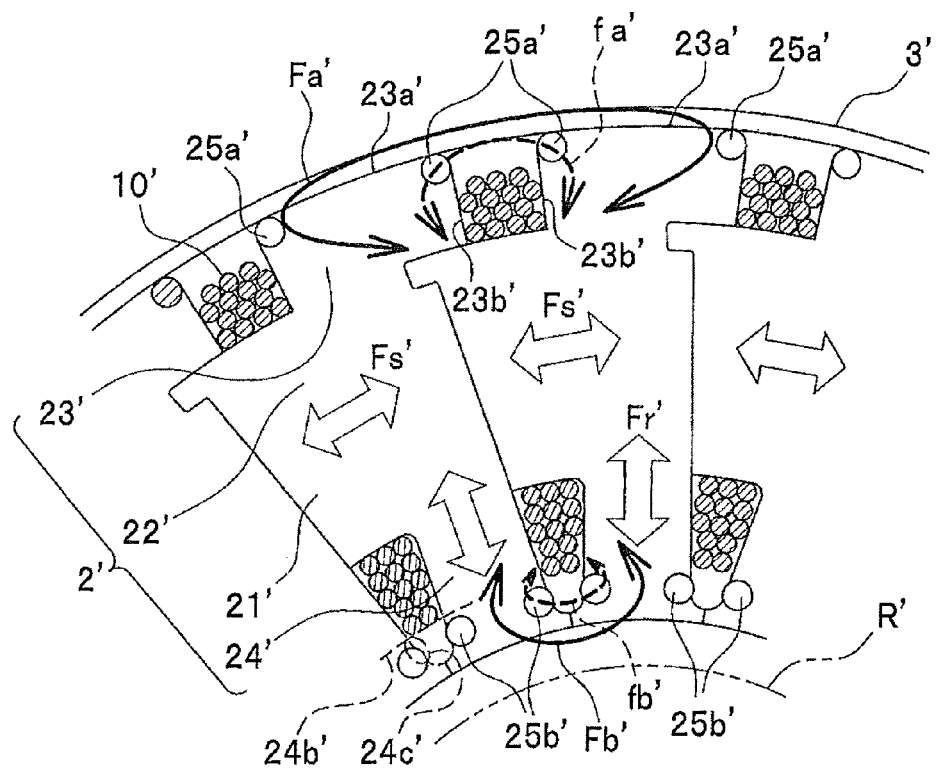
FIG. 6B is a partial sectional view of the stator according to the second embodiment of the present invention for illustrating operation of the notch.

Referring mainly to FIGS. 6A and 6B, will be described the stator for an electrical rotating machine according to a second embodiment. FIG. 6A is a perspective view of divided cores 2' according to the second embodiment and FIG. 6B is a partial sectional view of the stator 1 for illustrating an operation of the divided cores.

The divided core 2' according to the second embodiment is similar to the divided core 2 according to the first embodiment and is used as replacement of the divided core 2 in the stator 1. Thus, different points in the divided cores 2' will be mainly described.

The divided cores 2' according to the second embodiment of the present invention is a laminated member in which a plurality of electric steel plates made of a magnetic material are laminated and integrated by welding at two points at each of the connection part 23' and the tooth 24'.

More specifically, at the connection part 23' welding is made at welds 25a' across a thickness of the divided core 2'. At the teeth 24' welding is made at corresponding positions of notches 25 as welds 25b'.

In the second embodiment, spot welding is made at two points at the connection part 23' and the teeth 24', respectively. However, the second embodiment is not limited to this, but may be modified. For example, the number of the welding points may be not four as long as a fixing force in a laminating direction is kept. Further, other welding methods can be used in addition to the spot welding such as seam welding or a combined welding method.

As shown in FIG. 6A the divided cores 2' includes a bobbin part 21' around which the stator winding 10' is wound (see FIG. 3), a yoke 22' extending from the bobbin part 21' in the circumferential direction, and a connection part 23' having a connection face 23a' to be connected to a holding member 3', and a teeth 24' extending from the yoke 22' inwardly in the radial direction RD of the stator 1.

In the connection part 23', as shown in FIG. 6B, welds 25a', 25a' are formed at locations corresponding to the notches 25 for forming magnetic gaps in the first embodiment, i.e., edges defined by the side face 23b', 23b' to be in contact with the stator windings 10' and connection face 23a'. As shown in FIG. 6A, the notches 25a' are formed across an entire length of the divided core 2' in the axial direction at an edge.

Further, the divided core 2' according to the second embodiment, second welds (weld zones) 25b', 25b' are formed at the teeth 24' in addition to the welds 25a', 25a' (first weld) formed at locations corresponding to the notches 25 according to the first embodiment.

More specifically, the second welds 25b', 25b' are inside an end face 24b' of the stator windings 10' in the radial direction RD and formed adjacent to a side face 24c' which closes an end, inside in the radial direction RD, of the slot 11a with the side face 24c' of the adjacent divided core 2'.

The welds 25a', 25a' and the second welds 25b', 25b' are formed in consideration of a welding strength as well as a magnetic resistance is adequately set as a magnetic gap in accordance with a magnetic resistance of a melted metal at the welded part (so called nugget), a sectional area and a volume of the welded part.

As mentioned above, the divided core 2' according to the second embodiment is provided with, in addition to the welds 25a', 25a' formed at locations corresponding to the notches 25 according to the first embodiment, second welds 25b', 25b' at the teeth 24'. Accordingly, in addition to the leakage magnetic flux leaked to the holding member 3' from the connection part 23' to the holding member 3', the leakage magnetic flux at the teeth 24' (not interlinking the rotor R) at an inner circumferential part of the stator 1 according to the second embodiment can be reduced. Further, the magnetic flux (leakage magnetic flux) which does not contribute to generation of torque in the electrical rotating machine can be suppressed. In other words, the magnetic flux passing between an inside surface of the turns of the stator windings 10 (bundle of the stator windings 10 in a slot 11) and a surface of the rotor R can be reduced.

Accordingly, a quantity of an effective magnetic flux interlinking with the rotor R can be increased, so that efficiency and output characteristics of the electrical rotating machine can be improved.

The divided core 2' according to the second embodiment is provided with the welds 25a', 25a', so that the magnetic gap is formed with a high magnetic resistance because both the material of the divided core and the material for welding are melted and combined. Accordingly, for example, this configuration allows the divided core 2' to be integrally formed with a plurality of electric steel plates by spot-welding. This improves a manufacturing efficiency. This may decrease the magnetic flux in magnitude that is leaked to the holding member 3' to suppress an eddy current loss in the holding member with improvement of output characteristics of the electrical rotating machine.

When a current flows through the stator winding 10' in the stator 1 according to the second embodiment of the present invention, as shown in FIG. 6B, the stator winding 10' generates therearound main magnetic flux Fs' on a magnetic path extending in the circumferential direction CIR at the yoke 22' of the stator 1 and a main magnetic flux Fr' on a magnetic path extending from the main magnetic flux Fs' via the tooth 24' and in the radial direction RD toward a rotor R'.

The magnetic gap (weld 25a') is provided to increase the magnetic resistance in a path of the magnetic flux, generated by the stator winding 10', passing through the connection member 3'. This allows the path of the magnetic flux to bypass the magnetic gap 25a' with a larger loop magnetic flux path. In other words, an intensity of the magnetic flux on the path fa' is weakened.

Further, the magnetic gap (weld 25b') is provided to increase the magnetic resistance in a path of magnetic flux, generated by the stator winding 10', emitted by one of the teeth 24' to the tooth of the adjacent divided core 2' not via the rotor R'. This allows the path fa' of the magnetic flux to bypass the magnetic gap with a larger loop magnetic flux path Fa'. In other words, an intensity of the magnetic flux on the path fb' is weakened.

As described above, the embodiments are described in detail. However, the present invention is not limited to this and can be modified.

For example, a radial gap type motor is exemplified in which the stators according to the first and second embodiment are applied thereto. However, the type of the motor is not limited to this, but the stators are applicable to an axial gap type motor. Further, a stator of a power generator (not a motor) can be configured similarly.

In the first and second embodiments, the holding member 3 (3') is provided for annularly holing a plurality of divided cores 2,2—in which the holding member 3 covers the connection faces 23a at an outer circumferential of all divided cores 2, 2—, and all divided cores 2 have the magnetic gaps. However, the holding member 3 is not limited to this, but may be a part of a plurality of the divided cores 2, 2—are provided with the magnetic gaps.

As mentioned above, the present invention provides the stator 1 having a ring shape, as shown in FIG. 1, for an electrical rotating machine, includes a plurality of divided cores 2 disposed in the circumferential direction CIR of the stator core 1, the stator winding 10 toroidally wound on the stator 1, the holding member that is connected to the outer circumferential faces of the divided cores 2 and holds the divided cores in the ring shape. Each of the divided cores includes: the bobbin part 21 on which the stator winding 10 is wound, the yoke 22 extending from the bobbin part 21 in the circumferential direction CIR; the connection part 23 extending from the yoke 22 outwardly in the radial direction RD of the ring shape with a connection face that is connected to the holding member 3; and a tooth extending from the yoke inwardly in the radial direction RD. The connection part comprises a magnetic gap to increase a magnetic resistance in a path of magnetic flux, generated by the stator winding, leaked to the holding member through the connection face (passing through the holding member 3 (3') via the connection face 23a (23'). The magnetic gap comprises the notch 25 or a weld 25a, 25b (weld zone).

The connection part 23 includes the side face 23a that is an end of the connection part in the circumferential direction CIR and defines the slot 11 for the stator winding together with the bobbin part and the magnetic gap is between the side face and the connection face of the connection part.

The notch 25 is formed in the connection part so that an end of the connection part includes the taper part 12 when viewed in an axial direction near an end of the connection face.

The taper part 12 includes a slope either of a line, a convex arc, or a concave arc when viewed in an axial direction.

The tooth 24 includes magnetic gap comprising a weld to increase the magnetic resistance in the path of magnetic flux, generated by the stator winding, to the tooth of an adjacent divided core at a location inside the stator winding in the radial direction RD on a side face of the tooth that is an end of the tooth in the circumferential direction that defines the slot 11 for the stator winding 10 together with the bobbin part 21.

The divided core 2 (2') comprises a magnetic material.

Figure 7A:
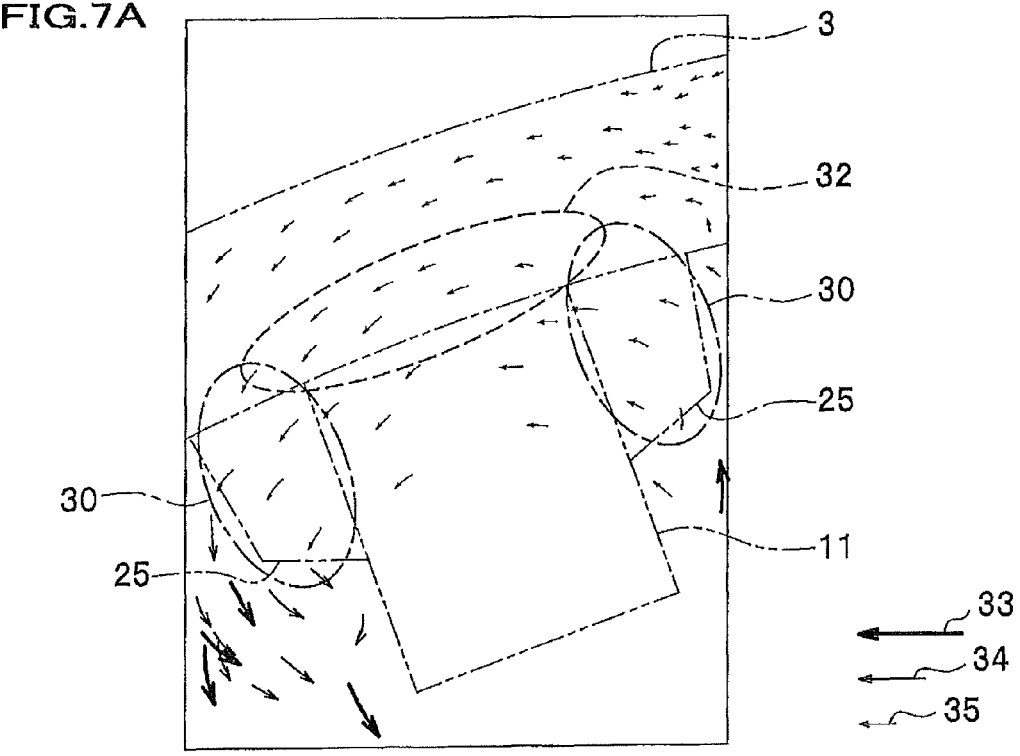
FIG. 7A is an illustration of a simulation result of density of magnetic flux distribution at the connection member and therearound with the magnetic gap according to the present invention.
Figure 7B:
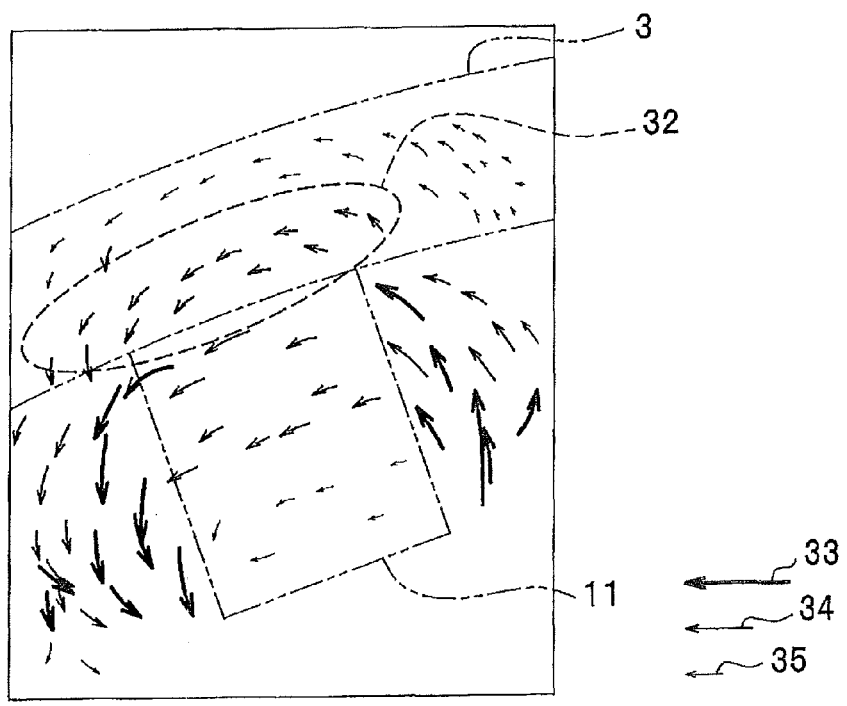
FIG. 7B is an illustration of a simulation result of density of the magnetic flux distribution at the connection member and therearound of the stator without the magnetic gap.

FIG. 7A is an illustration of a simulation result of a magnetic flux density distribution at the connection member 3 (3') and therearound with the magnetic gap according to the present invention. FIG. 7B is an illustration of a simulation result of the magnetic flux density distribution at the connection member 3 and therearound of the stator 1 before forming the magnetic gap or without the magnetic gap. In FIGS. 7A and 7B, thick-line arrows 33 indicate high densities of the magnetic flux, middle-thickness-line arrows 34 indicate medium densities of the magnetic flux, thin-line arrows 35 indicate low densities of the magnetic flux.

At an area 32 in the connection member 3 (3') in FIG. 7B, a density of the magnetic flux without the magnetic gap has the intermediate magnitude. On the other hand, at the area 32 in the connection member 3 (3') in FIG. 7A, densities of the magnetic flux with the magnetic gap is low.

Thus, increase in the magnetic resistance at the area 30 with the notch 25 or the weld 25a' reduces the density of the magnetic flux in the connection member 3 (3').

Further the inventors calculated a loss in the connection member 3 (3') from the measurement shown in FIG. 7A with the magnetic gap and 7B without the magnetic gap. The loss without the magnetic gap is 152 W, and the loss with the magnetic gap is 112 W. Thus, a reduction rate in the loss is 26.3%. Accordingly, forming the magnetic gap 25 at a path of the magnetic flux leaked to the connection member 3 (3') through the contact face 23a effectively reduces loss in the connection member 3 (3').

The invention claimed is:

1. A stator having a ring shape for an electrical rotating machine, comprising:
a plurality of divided cores disposed in a circumferential direction of the stator;
a stator winding toroidal wound on the stator;
a holding member that is connected to an outer circumferential faces of the divided cores and holds the divided cores in the ring shape,
wherein each of the divided cores comprises:
a bobbin part on which the stator winding is wound;
a yoke extending from the bobbin part in the circumferential direction;
a connection part extending from the yoke outwardly in a radial direction of the stator with a connection face that is connected to the holding member; and
a tooth extending from the yoke inwardly in the radial direction, wherein the connection part comprises a magnetic gap to increase a magnetic resistance in a path of magnetic flux, generated by the stator winding, leaked to the holding member through the connection face, wherein the magnetic gap comprises a notch or a weld with a tapered sectional shape at an edge between an end face in the circumferential direction of the connection part and the connection face.

2. The stator as claimed in claim 1, wherein the connection part includes a side face that is an end of the connection part in the circumferential direction and defines a slot for the stator winding together with the bobbin part and the magnetic gap is between the side face and the connection face of the connection part.

3. The stator as claimed in claim 2, wherein the notch is formed in the connection part so that an end of the connection part includes a taper part when viewed in an axial direction near an end of the connection face.

4. The stator as claimed in claim 3, wherein the taper part includes a slope either of a line, a convex arc, or a concave arc when viewed in an axial direction.

5. The stator as claimed in claim 1, wherein the tooth comprises a magnetic gap comprising another weld to increase a magnetic resistance in a path of magnetic flux, generated by the stator winding, to the tooth of an adjacent divided core at a location inside the stator winding in the radial direction on a side face of the tooth that is an end of the tooth in the circumferential direction that defines a slot for the stator winding together with the bobbin part.

6. The stator as claimed in claim 1, wherein the divided core comprises a magnetic material.

7. The stator as claimed in claim 1, wherein a length of the notch in a circumferential direction is smaller than a length of the connection surface in the circumferential direction.

8. The stator as claimed in claim 1, wherein the magnetic gap includes an edge on a side face of the connection part, and a height of the edge is substantially equal to that of a bundle of the stator winding from an upper face of the bobbin part.

* * * * *